US012589391B2

(12) United States Patent
Chu et al.

(10) Patent No.: US 12,589,391 B2
(45) Date of Patent: Mar. 31, 2026

(54) SAMPLE HOLDERS, PCR STATION ASSEMBLIES, AND METHODS OF OPERATING PCR TESTING SYSTEM

(71) Applicant: Siemens Healthcare Diagnostics Inc., Tarrytown, NY (US)

(72) Inventors: Daniel Chu, Hercules, CA (US); Paul Patt, Walnut Creek, CA (US); Garret Bautista, El Cerrito, CA (US); David John Guckenberger, Jr., Oakland, CA (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 775 days.

(21) Appl. No.: 17/759,378

(22) PCT Filed: Feb. 8, 2021

(86) PCT No.: PCT/US2021/070132
§ 371 (c)(1),
(2) Date: Jul. 25, 2022

(87) PCT Pub. No.: WO2021/189064
PCT Pub. Date: Sep. 23, 2021

(65) Prior Publication Data

US 2023/0053732 A1 Feb. 23, 2023

Related U.S. Application Data

(60) Provisional application No. 62/989,948, filed on Mar. 16, 2020.

(51) Int. Cl.

| | |
|---|---|
| ***B01L 3/00*** | (2006.01) |
| ***B01L 7/00*** | (2006.01) |
| ***B01L 9/00*** | (2006.01) |

(52) U.S. Cl.
CPC ......... *B01L 3/502715* (2013.01); *B01L 3/565* (2013.01); *B01L 7/52* (2013.01);
(Continued)

(58) Field of Classification Search
CPC ...... B01L 3/502715; B01L 3/565; B01L 7/52; B01L 9/50; B01L 2200/0689;
(Continued)

(56) References Cited

U.S. PATENT DOCUMENTS

| | | | |
|---|---|---|---|
| 4,902,624 | A | 2/1990 | Columbus et al. |
| 7,740,804 | B2 | 6/2010 | Samsoondar et al. |

(Continued)

FOREIGN PATENT DOCUMENTS

| | | |
|---|---|---|
| CN | 106929408 | 7/2017 |
| CN | 110082294 | 8/2019 |

(Continued)

OTHER PUBLICATIONS

International Search Report for PCT/US2021/070132 dated May 13, 2021.

*Primary Examiner* — Samuel P Siefke

(57) ABSTRACT

A sample holder for PCR processing. The sample holder includes a body with an inlet and outlet grooves formed alongside each other, a detection recess that is connected to the inlet and outlet grooves, and a fill port interconnected to both the inlet and outlet grooves, and a cover interfacing with the body to form an inlet channel interconnected to the fill port, a detection region interconnected to the inlet channel, and an outlet channel interconnected to the detection region and the fill port. The detection region is configured to receive a PCR solution from the fill port and replication occurs within the detection region via heating and cooling cycles. Thereafter, fluorescent emissions from tagged replicated DNA/RNA in the detection region are detected and measured. PCR stations, PCR station assemblies, PCR testing systems, and methods of operating a PCR testing systems are provided, as are other aspects.

15 Claims, 7 Drawing Sheets

(52) U.S. Cl.
CPC ......... *B01L 9/50* (2013.01); *B01L 2200/0689* (2013.01); *B01L 2300/12* (2013.01)

(58) Field of Classification Search
CPC ............. B01L 2300/12; B01L 2200/12; B01L 2200/147; G01N 33/487; C12Q 1/686
See application file for complete search history.

(56) References Cited

U.S. PATENT DOCUMENTS

| | | | |
|---|---|---|---|
| 9,222,935 | B1 | 12/2015 | Bransky et al. |
| 10,052,629 | B2 | 8/2018 | Andreyev et al. |
| 2003/0008308 | A1 | 1/2003 | Enzelberger et al. |
| 2004/0241051 | A1* | 12/2004 | Wyzgol ............. B01L 3/502746 422/400 |
| 2008/0180658 | A1 | 7/2008 | Samsoondar |
| 2010/0003683 | A1 | 1/2010 | Sarofrim et al. |
| 2014/0073013 | A1 | 3/2014 | Gorman et al. |
| 2015/0300957 | A1 | 10/2015 | Salsman |
| 2017/0259263 | A1 | 9/2017 | Andreyev et al. |
| 2019/0099757 | A1 | 4/2019 | Sekizawa et al. |
| 2019/0151845 | A1 | 5/2019 | Williamson et al. |
| 2019/0225958 | A1 | 7/2019 | Steffen et al. |

FOREIGN PATENT DOCUMENTS

| | | |
|---|---|---|
| CN | 110616138 | 12/2019 |
| WO | 2016161337 | 10/2016 |
| WO | 2019116209 | 6/2019 |

* cited by examiner

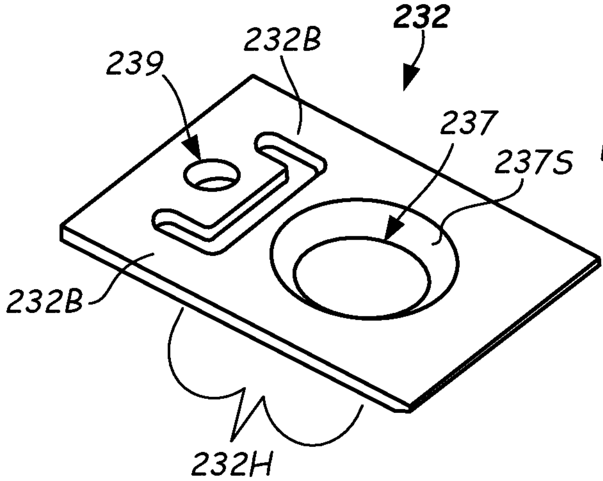
FIG. 2C
FIG. 2D
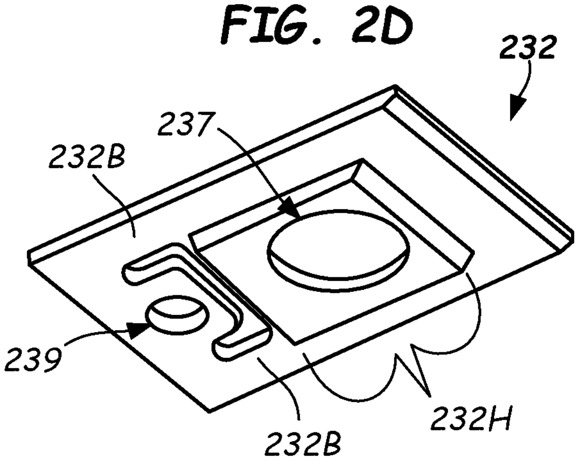
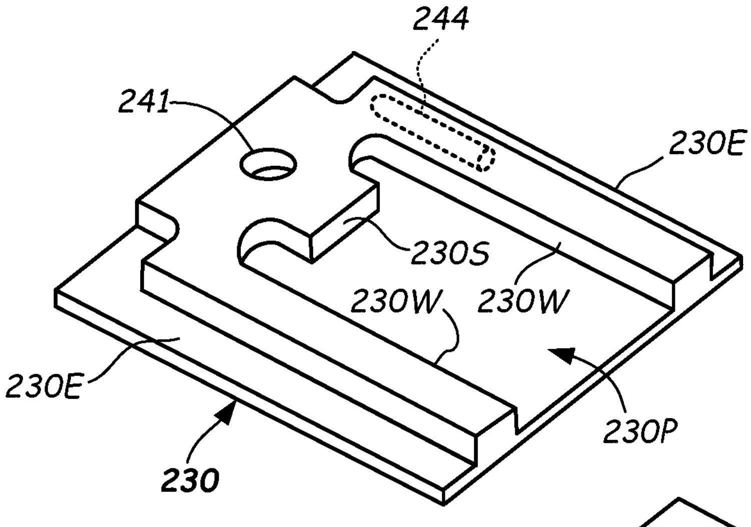
FIG. 2E
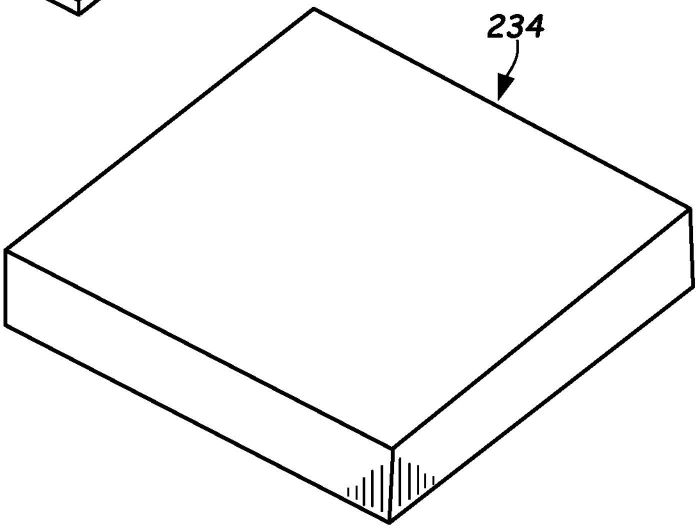
FIG. 2F

SAMPLE HOLDERS, PCR STATION ASSEMBLIES, AND METHODS OF OPERATING PCR TESTING SYSTEM

FIELD

The present disclosure relates to a sample holder used in automated polymerase chain reaction (PCR) testing of DNA or RNA templates extracted from a biological sample. Moreover, the disclosure relates to thermal cyclers and methods and assemblies for producing and testing the replicated DNA/RNA.

BACKGROUND

Testing within diagnostic laboratories, for example, may involve extracting and quantifying one or more constituents in a biological sample obtained from a patient, such as from blood serum or blood plasma.

PCR testing, in particular, is a technique used to amplify a targeted DNA or RNA sequence from a few extracted DNA or RNA fragments (hereinafter the "DNA/RNA template") that have been extracted from the biological sample to billions of copies within a short period of time. For example, PCR testing can be used for identification of DNA/RNA sequences involved in cancer or genetic disorders, such as cystic fibrosis, or for the identification and diagnosis of diseases caused by fungi, bacteria, and viruses.

In such PCR processing, cycles of heating and cooling are repeated many times on a PCR solution containing the extracted DNA/RNA templates, a master mix, possibly and reagent, and possibly water, leading to a large number of (e.g., more than one billion in some cases) exact copies of the originally-extracted DNA/RNA templates. Once the replication has occurred, an optical technique such as fluorescence staining may be used to determine the amount of replicated DNA/RNA that is present and/or analyze sequences thereof.

SUMMARY

According to a first aspect, a sample holder is provided. The sample holder includes a body having a top surface and a bottom surface, the body further comprising: an inlet groove formed into the bottom surface; an outlet groove formed into the bottom surface alongside the inlet groove; a detection recess formed into the bottom surface and connected to the inlet groove and the outlet groove; a fill port interconnected to both the inlet groove and the outlet groove; and a cover connected to the bottom surface wherein the cover interfaces with the body to form an inlet channel interconnected to the fill port, a detection region interconnected to the inlet channel, and an outlet channel interconnected to the detection region and the fill port.

According to another aspect, a PCR station assembly is provided. The PCR station assembly includes a base configured to receive a sample holder; a clamp member configured to secure the sample holder to the base; and a temperature-controlling element operable to heat and cool the base in intimate thermal contact with the sample holder. The sample holder can include the configuration defined in claim 1 herein.

In another aspect, a method of operating a PCR testing system is provided. The method includes providing a PCR station comprising a base, a clamp member, and a temperature-controlling element thermally coupled to the base; securing a sample holder between the base and clamp member, the sample holder including an inlet channel interconnected to a fill port, a detection region interconnected to the inlet channel, and an outlet channel interconnected to the detection region and the fill port; inserting a volume of PCR solution into the fill port thus filling the detection region; subjecting the PCR solution to heating and cooling by subjecting the base to cycles of heating and cooling with the temperature-controlling element to replicate tagged DNA/RNA templates to produce tagged replicated DNA/RNA; and after a predetermined number of heating and cooling cycles, measuring fluorescent emissions from the detecting region with an optical interrogation apparatus by exciting the tagged replicated DNA/RNA with a particular wavelength of light.

Still other aspects, features, and advantages of the present disclosure may be readily apparent from the following detailed description by illustrating a number of example embodiments and implementations. The present invention may also be capable of other and different embodiments, and its several details may be modified in various respects. The disclosure is to cover all modifications, equivalents, and alternatives falling within the scope of the claims.

BRIEF DESCRIPTION OF THE DRAWINGS

The disclosure will be better understood by referring to the detailed description taken in conjunction with the following drawings. The drawings and descriptions are to be regarded as illustrative in nature, and not as restrictive. The drawings are not necessarily drawn to scale. Like numerals are used throughout to denote like elements.

FIGS. 2C-2D illustrate top and bottom perspective views, respectively, of a clamp member of a PCR station assembly according to one or more embodiments of the disclosure.

FIG. 2E illustrates a top perspective view of a base of a PCR station assembly configured to receive a sample holder according to one or more embodiments of the disclosure.

FIG. 2F illustrates a top perspective view of a temperature-controlling element operable to heat and cool the base of a PCR station assembly that is provided in intimate thermal contact with the sample holder according to one or more embodiments of the disclosure.

DETAILED DESCRIPTION

Figure 1A:
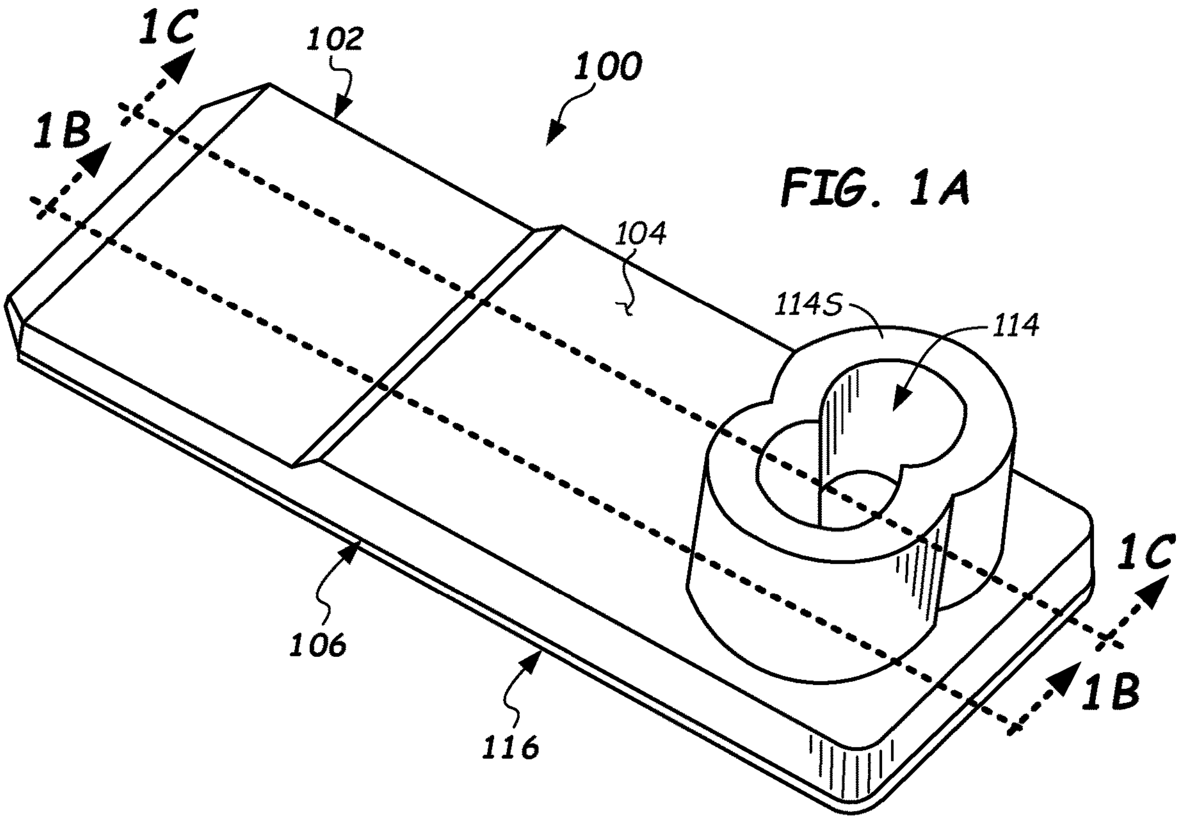
FIG. 1A illustrates a top perspective view of a sample holder according to one or more embodiments of the disclosure.
Figure 1B:
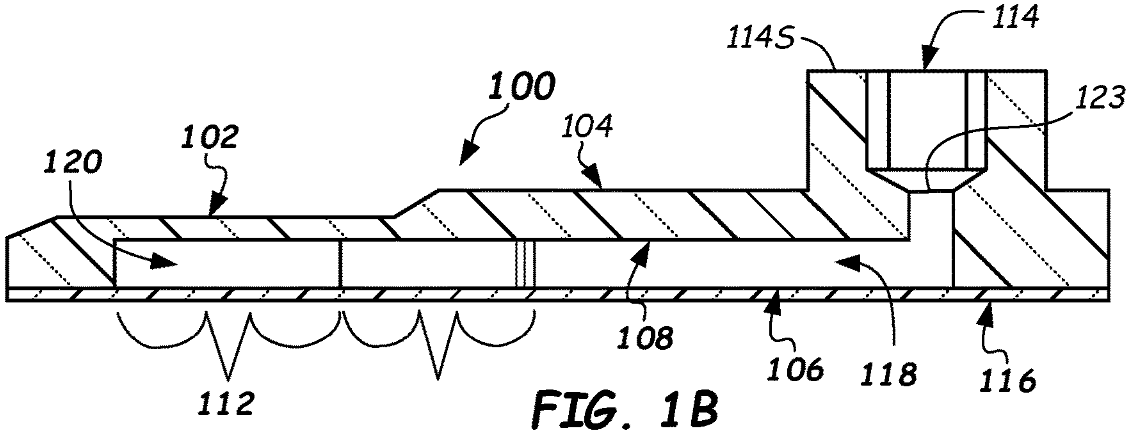
FIG. 1B illustrates a cross-sectioned side view of a sample holder taken along section line 1B-1B of FIG. 1A according to one or more embodiments of the disclosure.
Figure 1C:
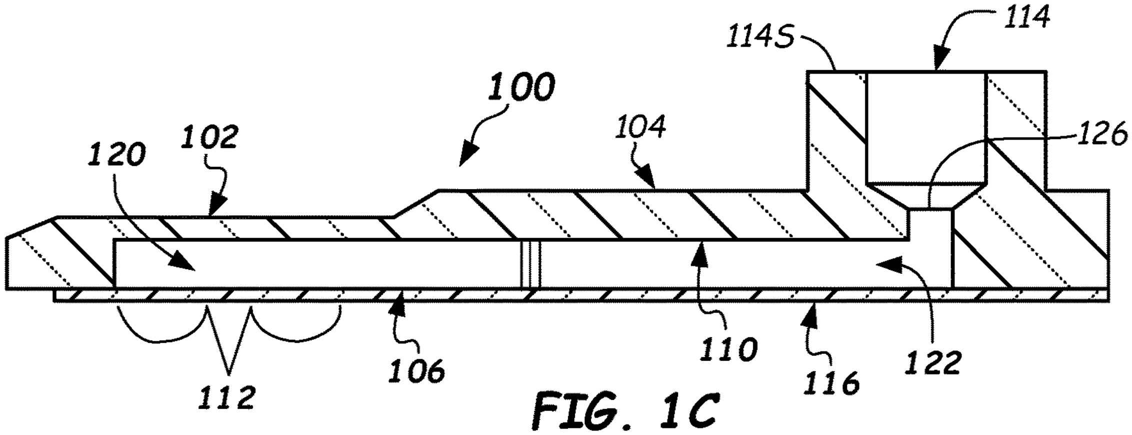
FIG. 1C illustrates another cross-sectioned side view of a sample holder taken along section line 1C-1C of FIG. 1A according to one or more embodiments of the disclosure.
Figure 1D:
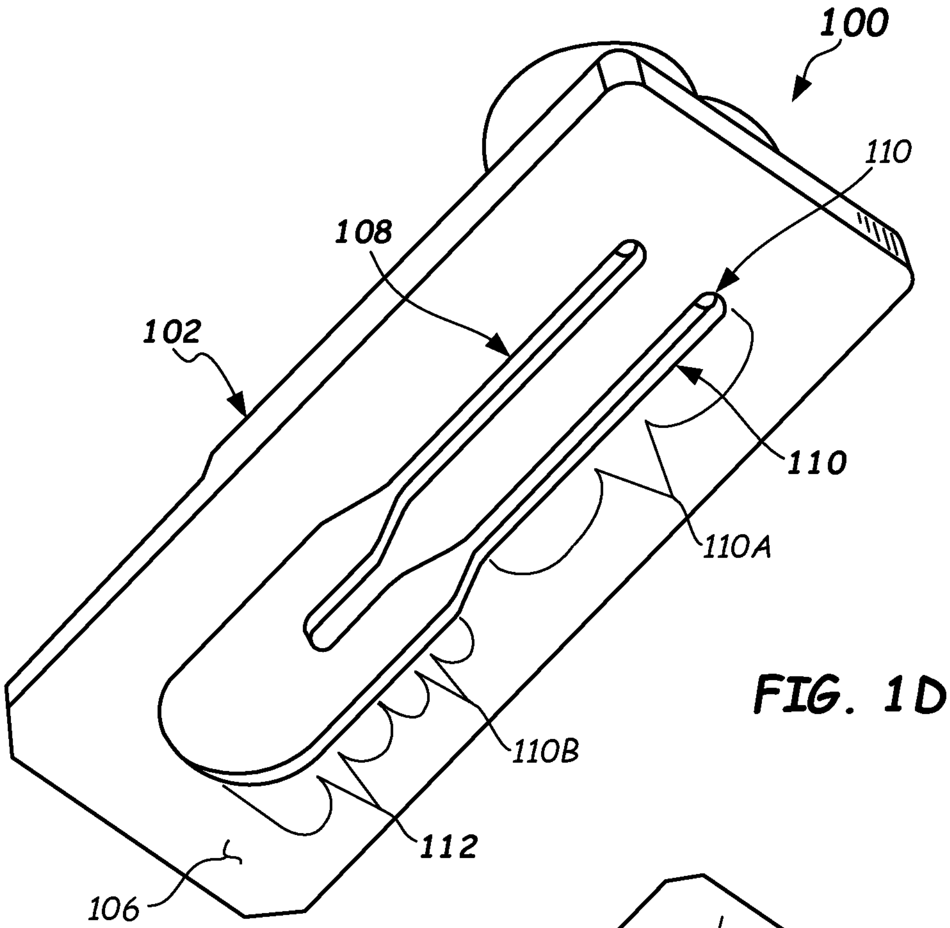
FIG. 1D illustrates a bottom perspective view of a sample holder, with the cover removed for illustration purposes, according to one or more embodiments of the disclosure.
Figure 1E:
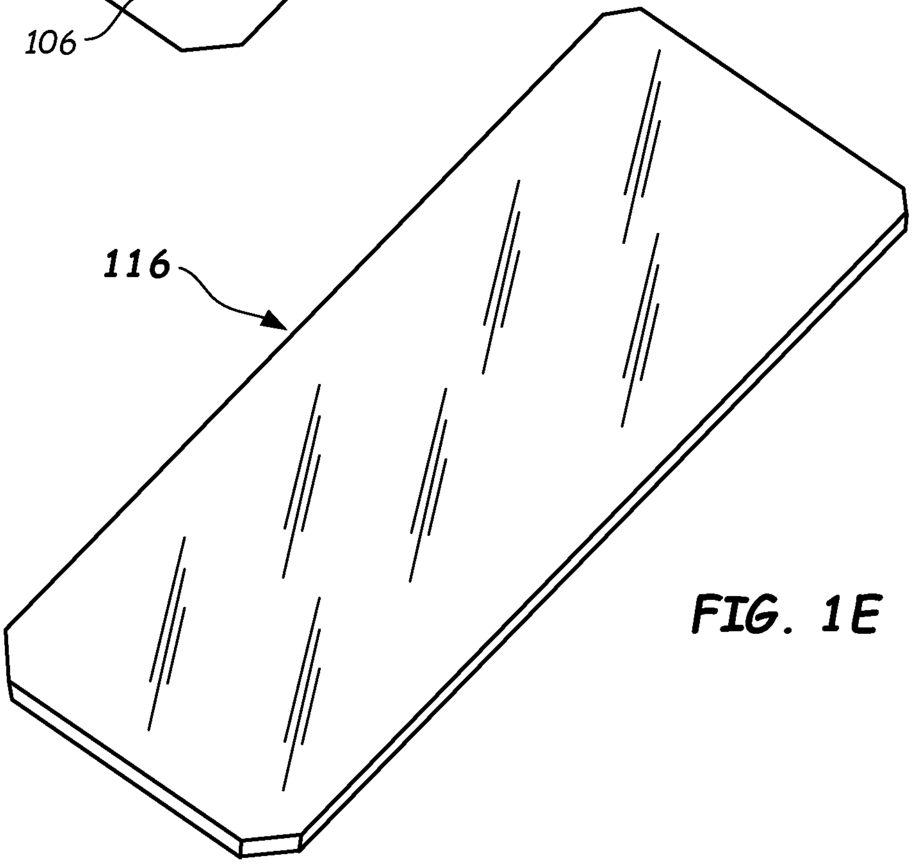
FIG. 1E illustrates a bottom plan view of a cover according to one or more embodiments of the disclosure.

The present disclosure is directed at sample holders for use in, for example, PCR testing. In particular, the sample holders can provide a low-cost design that can be used with automated PCR processing for both the amplification phase and detection phases of PCR processing. The sample holder can be intended for a single use, and disposed thereafter. Optionally, the sample holder may be washed and reused.

In another aspect, the sample holder is miniaturized in that the sample holder can perform detection (e.g., fluorescence or other detection) on very small volumes of the PCR solution including the extracted DNA/RNA templates, master mix, and possibly a reagent, such as less than or equal to 20 μL, or even from 5 μL to 20 μL in the detection region.

In another aspect, the PCR station assembly is provided that is configured to hold the sample holder in a defined position for the amplification and detection phases of PCR. During the amplification phase, the PCR solution is subjected to multiple heating and cooling cycles to replicate the DNA/RNA templates. Thereafter, the PCR station assembly holds the sample holder containing the replicated DNA/RNA templates for interrogation by an optical interrogation apparatus, such as a fluorescence detection apparatus.

In view of the foregoing, there is an unmet for simple and cost effective sample holders for PCR testing, and that can process even very small volumes of the PCR solution containing thin a detection region thereof (e.g., ≤20 μL).

These and other aspects and features of embodiments of the disclosure will be described with reference to FIGS. 1A-4 herein.

Referring now to FIGS. 1A-1G, an example embodiment of a sample holder 100 will now be described. The sample holder 100 comprises a body 102 having a top surface 104 and a bottom surface 106. The bottom surface 106 may be a planar surface. The body 102 may be manufactured from an optically transparent or translucent material such as glass or plastic. Molded plastics may include transparent (e.g., thermoplastic materials) or translucent materials (e.g., white or frosted) plastics that are compatible with the particular PCR master mix and possibly a reagent being used. Example materials may include elastomers and olefins, polyvinyl chloride (PVC), polycarbonate, polyethylene terephthalate glycol (PETG), styrene, polyethylene, polystyrene, acrylonitrile butadiene styrene (ABS), and polypropylene or combinations. Polycarbonate and polypropylene are excellent choices for inert and transparent/translucent properties for PCR. White and frosted may be used for qPCR. The body 102 can be injection molded, compression molded, or the like.

The body 102 further comprises an inlet groove 108 formed into the bottom surface 106 and an outlet groove 110 also formed into the bottom surface 106. The outlet groove 110 is positioned alongside the inlet groove 108. The groves 108, 110 may run in parallel and may be formed by molding. The inlet and outlet grooves 108, 100 can have groove depths of from 0.4 mm to 0.7 mm in depth. Grooves 108, 110 can have a variable groove width such as from 0.3 mm to 1.5 mm, for example.

The body 102 further comprises a detection recess 112 formed into the bottom surface 106. The detection recess 112 is sufficiently large for the particular optical interrogation system (e.g., optical interrogation system 340) to be able to measure light emission readings (e.g., fluorescence emission readings) therefrom, for example. The detection recess 112 may have a semi-circle of diameter between about 2 mm to 5 mm, for example. The detection area may be greater than 3.14 $mm^2$. Structurally, the inlet groove 108 leads to and is connected to the detection recess 112 and the outlet groove 110 is connected to and leads away from the detection recess 112. The groves 108, 110, and the detection recess 112 may be of the same depth from the bottom surface 106.

A fill port 114 can be interconnected to both the inlet groove 108 and the outlet groove 110 and provides both a fill and overflow function. The top surface 114S of the fill port 114 may be a planar surface and can be located above the top surface 104 and thus can be sealed with any suitable sealing membrane once the PCR solution 124 is received therein. Sealing may occur prior to insertion of the sample holder 100 in the PCR station assembly 225 (FIG. 2A) or after insertion therein.

The sample holder 100 can include a cover 116 connected to and sealed to the bottom surface 106 of the body 102 by any suitable means. The cover 116 can be a thin film cover in some embodiments, such as a generally planar sheet of constant thickness plastic or metal film. The thickness may be between 0.05 mm and 0.5 mm, for example. Other suitable thicknesses and other non-planar configurations of the cover 116 may be used. Depending on the configuration of the optical interrogation apparatus 340 (FIG. 3) used, the cover 116 may be translucent or transparent if the light detector is positioned below the body 102 and cover 116, or opaque if the light detector is positioned above the body 102. In the depicted embodiment of FIG. 3, the cover 116 can be opaque, such as a black plastic. The cover 116 interfaces with the body 102 to close the bottoms of the inlet groove 108, detection recess 112, and outlet groove 110 and thus form interconnected inlet channel 118, reservoir 119, and outlet channel 122.

The outlet channel 122 is thus interconnected to the reservoir 119 and the included detection region 120 therein and may also be connected to the fill port 114. The cover 116 may be bonded to the body 102 by any suitable means. For example, the cover 116 may be bonded by thermal bonding, ultrasonic welding, adhesive bonding, solvent bonding, or by including a pressure sensitive adhesive layer on the body 102. If a metal layer is used, and additional bonding layer of polymer can be used for thermal bonding.

In some embodiments, sealing of a PCR solution 124 in the reservoir 119 can involve at least one sealing member comprising heat sealing or deformation sealing along the lengths of one or more of the inlet channel 118 and outlet channel 122, or providing a sealing member such as a sealing film 233 sealing the top of the fill port 114, for example. Other sealing means may be used prior to PCR processing, such as deformation of the ports 123, 126, sealing of the ports 123, 126 by adhesive, or sealing with heavy oil (e.g., a mineral oil) in ports 126, 126 or channels 118, 122. If heat sealed, the thermal formed seals can be at two discreet locations along the lengths of the channels 118, 122 at locations that can minimize displacement of the plastic volume and maintain acceptable flatness.

The grooves 108, 110 may be locally modified to allow improved sealing. In some embodiments, more than one sealed area may be provided along each of the channels 118, 122 to provide for a primary and secondary seal for backup. The seals may avoid trapped air in the channels 118, 122. The second seal can be used to contain any displaced solution 124 that has been displaced by the first seal. In some embodiments, the fill port 114 can include one or more funnels connected one or more of the inlet and outlet ports 123, 126. The included cone angle can be less than 120 degrees, for example. The funnels aid in ensuring proper fill with PCR solution 124. The inlet and outlet ports 123, 126 may be located approximately equidistant from the detection area 120 along the length of the body 102 so that they can be easily sealed and both are uninterrupted and uncovered by any part of the PCR station 225 (FIG. 2).

Figure 1F:
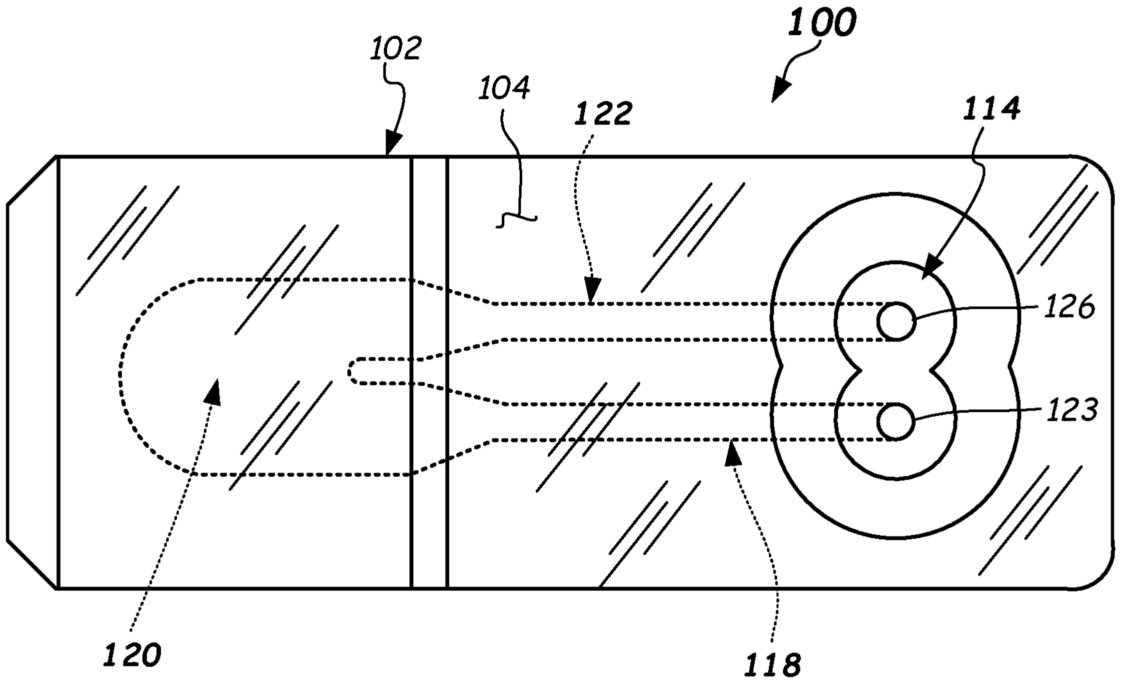
FIG. 1F illustrates a top plan view of a sample holder with an example flow path (shown dotted) according to one or more embodiments of the disclosure.
Figure 1G:
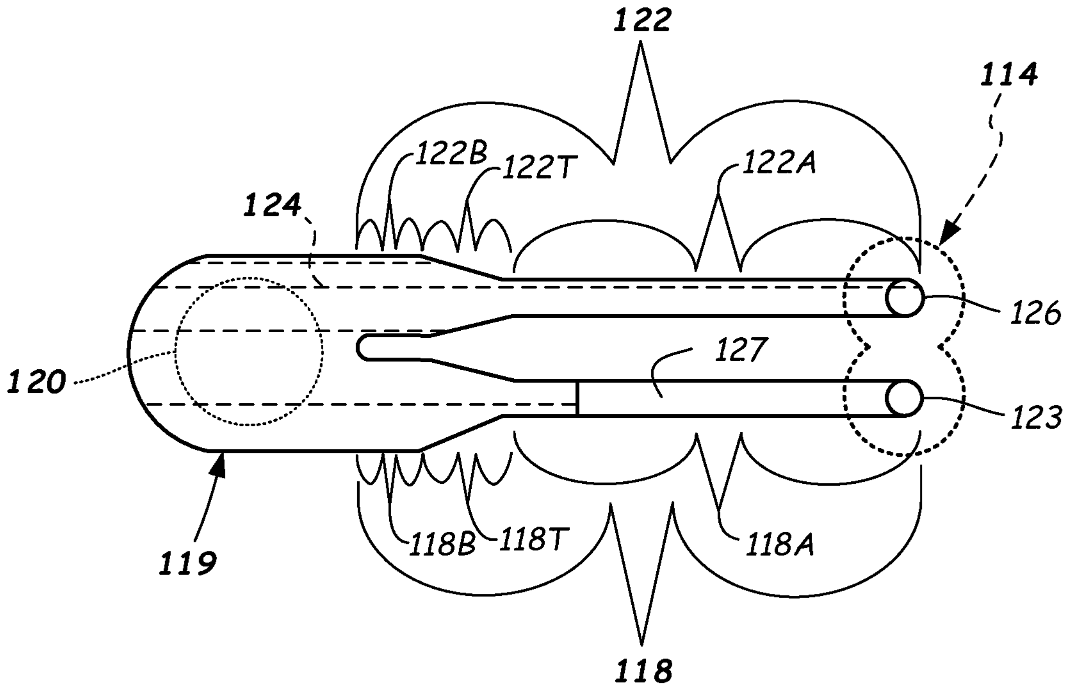
FIG. 1G illustrates a cutout view of the respective flow path for a sample through a sample holder (shown in isolation for illustration purposes) according to one or more embodiments of the disclosure.
Figure 2A:
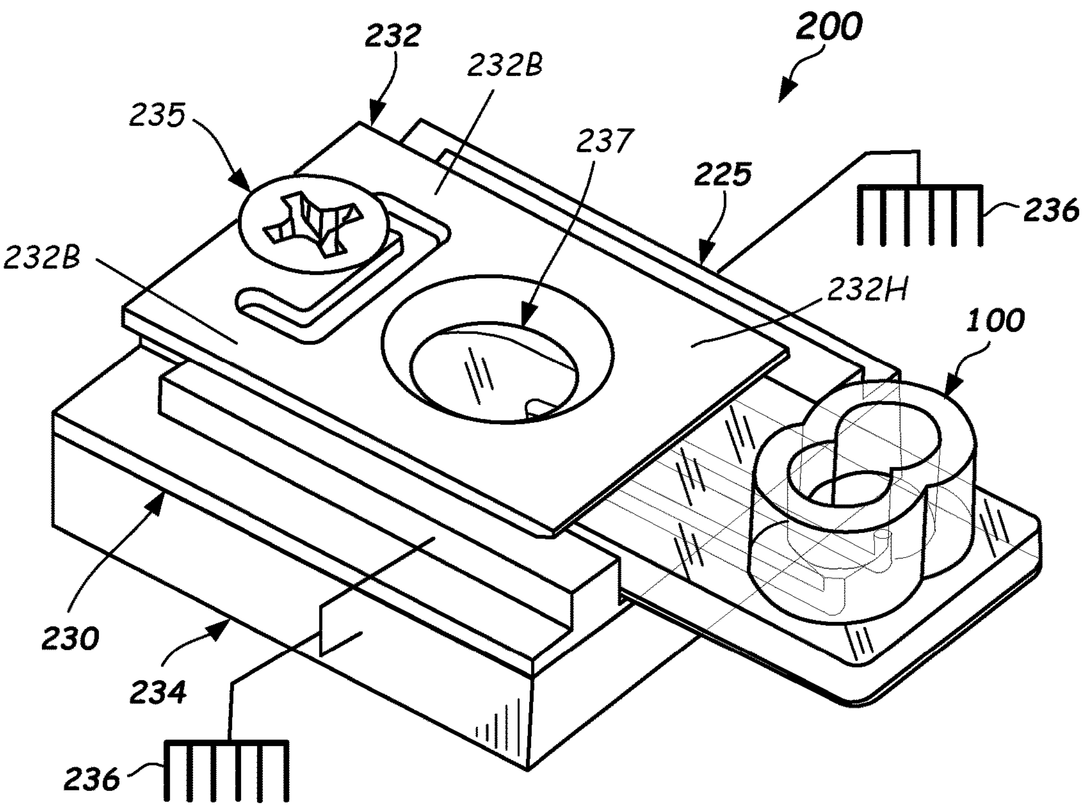
FIG. 2A illustrates a top perspective view of a PCR station assembly holding a sample holder according to one or more embodiments of the disclosure.
Figure 2B:
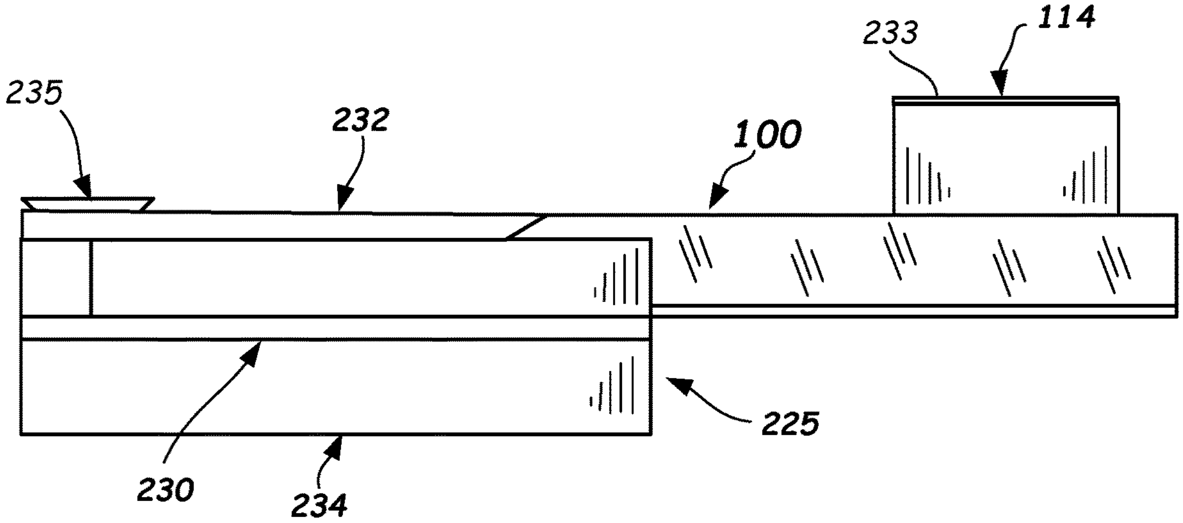
FIG. 2B illustrates a side view of a PCR station assembly holding a sample holder according to one or more embodiments of the disclosure.

In operation, as shown in FIGS. 1F and 1G, an inlet port 123 located in the fill port 114 receives the PCR solution 124 via a pipette or other liquid dispensing mechanism into the inlet channel 118. The PCR solution 124 is a suitable solution allowing amplification of the DNA/RNA (DNA/RNA means DNA, RNA or both as the case may be) templates extracted via conventional PCR sample processing operations. The PCR solution 124 includes PCR master mix, DNA/RNA templates, possibly a suitable reagent and possibly water. A PCR master mix is a premixed concentrated solution that has all of the components for a real-time PCR reaction that are not sample-specific. A master mix is a commercially available solution that contains a thermostable DNA/RNA polymerase, dNTPs, $MgCl_2$, and/or other additives in a buffer optimized for efficient PCR amplification of the DNA/RNA templates.

FIG. 1G shows the flow path for the PCR solution 124 in isolation for illustration purposes. The PCR solution 124 flows from the inlet port 123 through the inlet channel 118 and then into and fills the reservoir 119 and the detection region 120 therein. The PCR solution 124 then exits through the outlet channel 122, which connects to the outlet port 126, which can be co-located in the fill port 114 with the inlet port 123. Outlet port 126 acts as a vent. When the flow reaches the outlet port 126 of the outlet channel 122, the sample holder 100 is adequately full. In some embodiments, the inlet port 123 may be approximately the size of the pipette tip and air 127 may be inserted to move the PCR solution 124 further into the inlet channel 118, so as to further minimize the amount of the PCR solution 124 needed for replication and detection. The volume of the inlet channel 118, reservoir 119, and outlet channel 122 together can be less than 30 μL, and from 3 μL to 30 μL in some embodiments. The volume of the PCR liquid in the reservoir during detection phase can be ≤20 μL, or even from 3 μL to 20 μL in other embodiments. The fill port 114 can include a volume sufficient to reduce any splashing and ensure proper fill. If the inlet channel 118 and outlet channel 122 are sealed by heat sealing, the heat sealing should be close to the liquid-air interface, such as 1 mm to 2 mm therefrom to minimize any trapped air.

In more detail, the inlet channel 118 can comprise an inlet first channel portion 118A and an inlet second channel portion 118B that is wider than the inlet first channel portion 118A, and thus has a larger cross-sectional area. The inlet channel 118 can further comprise an inlet transition portion 118T that allows the inlet first channel portion 118A to generally smoothly transition to the larger inlet second channel portion 118B. The transition portion 118T can allow the PCR solution 124 to expand to the larger area of the inlet second channel portion 118B with less turbulence that might undesirably introduce bubbles in the PCR solution 124.

Likewise, the outlet channel 122 can comprises an outlet first channel portion 122A and an outlet second channel portion 122B that is wider than the outlet first channel portion 122A, and thus of a larger cross-sectional area. The outlet channel 122 can further comprise an outlet transition portion 122T that allows the transition from the larger outlet second channel portion 122B to the smaller outlet first channel portion 122A. The transition portion 122T allows the PCR solution 124 to contract from the larger area outlet second channel portion 122B to minimize the amount of PCR solution 124 in the sample holder 100.

Figure 3:
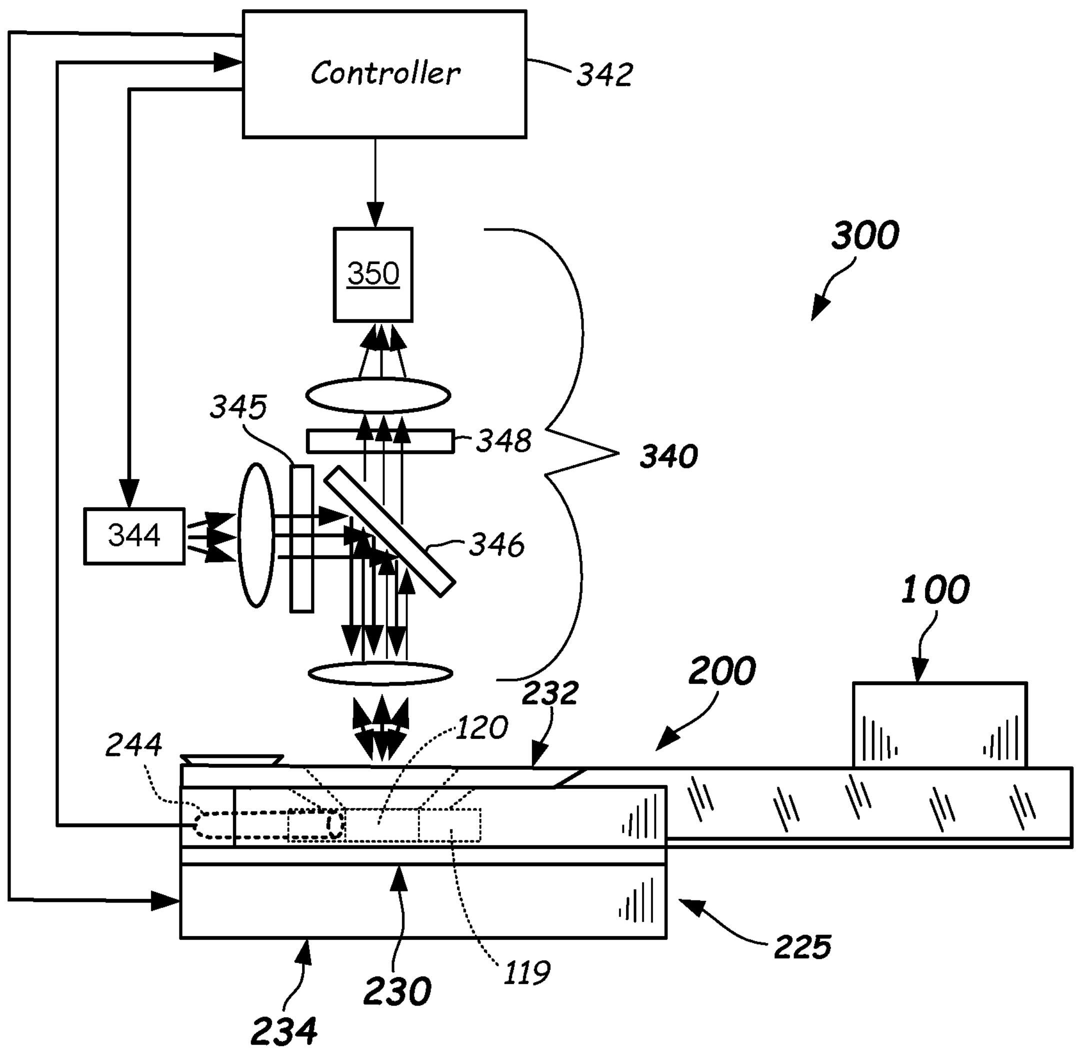
FIG. 3 illustrates a block diagram of a PCR testing assembly made up of a PCR station assembly and a sample holder being interrogated by an optical interrogation apparatus according to one or more embodiments of the disclosure.

The detection region 120 is a region that contains a volume of the PCR solution within the reservoir 119 that is adapted to contain the PCR solution 124 and replicated DNA/RNA templates after the amplification phase and that viewable by the optical interrogation apparatus 340, as shown in FIG. 3.

FIGS. 2A-2F illustrates a PCR station assembly 200 of a PCR station 225 and sample holder 100 mounted therein. The PCR station 225 is a fixture configured to hold the sample holder 100 during portions of the PCR processing including the amplification phase and detection phase. Amplification phase involves a large number of heating and cooling steps wherein DNA/RNA templates are replicated. Detection involves interrogation with an optical interrogation apparatus, such as optical interrogation apparatus 340 as shown in FIG. 3. A fluorescence detection interrogation apparatus is shown in FIG. 3; however, other suitable configurations and types of optical interrogation apparatus may be used.

In the depicted embodiment, the PCR station 225 can include a base 230 and a clamp member 232. The base 230 and clamp member 232 cooperate to form a recess that is appropriately sized to receive and retain, via clamping, the sample holder 100 therein. Any suitable clamp initiator 235, such as a screw or electro-, hydraulic- or pneumatic-actuator may be used to initiate the clamping. The clamping ensures intimate thermal contact of the bottom of the sample holder 100 with the base 230. The base 230 and the clamp member 232 may be made out of a highly thermally-conductive material, such as aluminum, copper, or the like.

The PCR station 225 can include a temperature-controlling element 234. Temperature-controlling element 234 can be a thermoelectric element such as a Peltier device that can rapidly heat and cool the base 230 that is in intimate thermal contact with the sample holder 100. Thus, rapid temperature cycling between heating and cooling can be provided as controlled by drive signals from one or more drivers of a controller 342 (FIG. 3). For example, temperature cycles between a lower nominal temperature of about 55° C. and an upper nominal temperature of about 95° C. can be implemented. Other suitable upper and lower nominal temperatures can be used. About as used herein means+/−20%.

The PCR station 225 can also include one or more heat sinks 236 coupled thermally to the base 230 and/or possibly to the temperature-controlling element 234. The one or more heat sinks 236 may be coupled to one or more sides or top of the base 230 and/or to the sides and/or bottom of the temperature-controlling element 234. Any suitable construction of the one or more heat sinks 236 may be used. The one or more heat sink may be aluminum or other conductive metal and may include a plurality of fins.

FIGS. 2C-2F illustrates the clamp member 232, base 230, and temperature-controlling element 234 in more detail. The clamp member 232 includes a viewing aperture 237 formed there through, which defines a viewing window for the optical interrogation apparatus 340. The aperture 237 may include angled side walls 237S, which may be angled at from 30 degrees to 60 degrees to a central axis of the aperture 237, for example. The viewing aperture 237 may be slightly smaller than the dimensions of the reservoir 119 and is the window through which fluorescence readings can be taken. The clamp member 232 can further include a bore 239 formed therein and adapted to receive the clamp initiator 235 (e.g., screw, actuator or the like). Spring beams 232B can flex and allow the holding portion 232H of the clamp member 232 located outboard from the beams 232B to secure the sample holder 100 in the pocket 230P (FIG. 2E) of the base 230. This the clamp member 232 acts as a spring clip to ensure good thermal contact between the sample holder 100 and the base 230.

Pocket 230P may include a stop 230S configured to limit the extent of insertion of the sample holder 100 in the pocket 230P. The pocket 230P can include lateral sidewalls 230W that aid in positioning the reservoir 119 of the sample holder 100 relative to the viewing aperture 237. The holding portion 232H can register against lateral sidewalls 230W. Base 230 further can include extenders 230E that extend to the width and length of the temperature-controlling element 234 to maximize thermal contact therewith.

In some embodiments, the base 230 may include a temperature sensor 244 in thermal contact with the base 230, such as by being mounted therein or thereon, such as in a hole formed therein proximate the detection region 120. The temperature sensor 244 may provide feedback information to estimate the temperature of the PCR solution 124 in the detection region 120. The temperature sensor 244 may be a thermocouple or a thermistor, for example, and may be used by the controller 342 to maintain the upper and lower temperatures of the heating and cooling cycles.

FIG. 2F illustrates a temperature-controlling element 234, such as a Peltier device that is configured to provide rapid heating and cooling cycles to the base 230 and thus to the PCR solution 124 contained in the reservoir 119 and at the detection region 120 of the sample bolder 100 mounted therein.

Referring now to FIG. 3, a PCR testing system 300 is shown and described. The PCR testing system 300 includes the PCR assembly 200 of the PCR station 225 and sample holder 100 and the optical interrogation apparatus 340. Optical interrogation apparatus 340 is configured to measure the optical emissions from tagged fluorescence (fluorophores) of the PCR solution 124 at one or more wavelengths after replication of the DNA/RNA templates. The optical interrogation apparatus 340 is an optical system including light source 344 such as a white light LED that projects light through collimating optics (e.g., one or more lenses), through a suitable color filter 345 that cuts out multiple spectra and allows one spectra to pass (e.g., blue light). This blue light spectrum is reflected off from a suitable dichroic mirror 346 and is focused by focusing optics (e.g., one or more appropriate lenses) onto the PCR solution 124 in the detection region 120 within the reservoir 119. This causes the tagged fluorophores responsive to the blue light to fluoresce. This fluorescent emission is then collimated and passed through the dichroic mirror 346, further filtered with filter 348 to remove any stray excitation light and then focused onto a light detector 350 with focusing optics (e.g., one or more suitable lenses). The relative intensity of the fluorescent emission measured by the detector 350 can render a relative amount of the tagged DNA sequence that is present. At least the filter 345 and dichroic mirror 346 can be changed out to enable discrimination at one or more other wavelengths, and to allow analysis of sequences.

Figure 4:
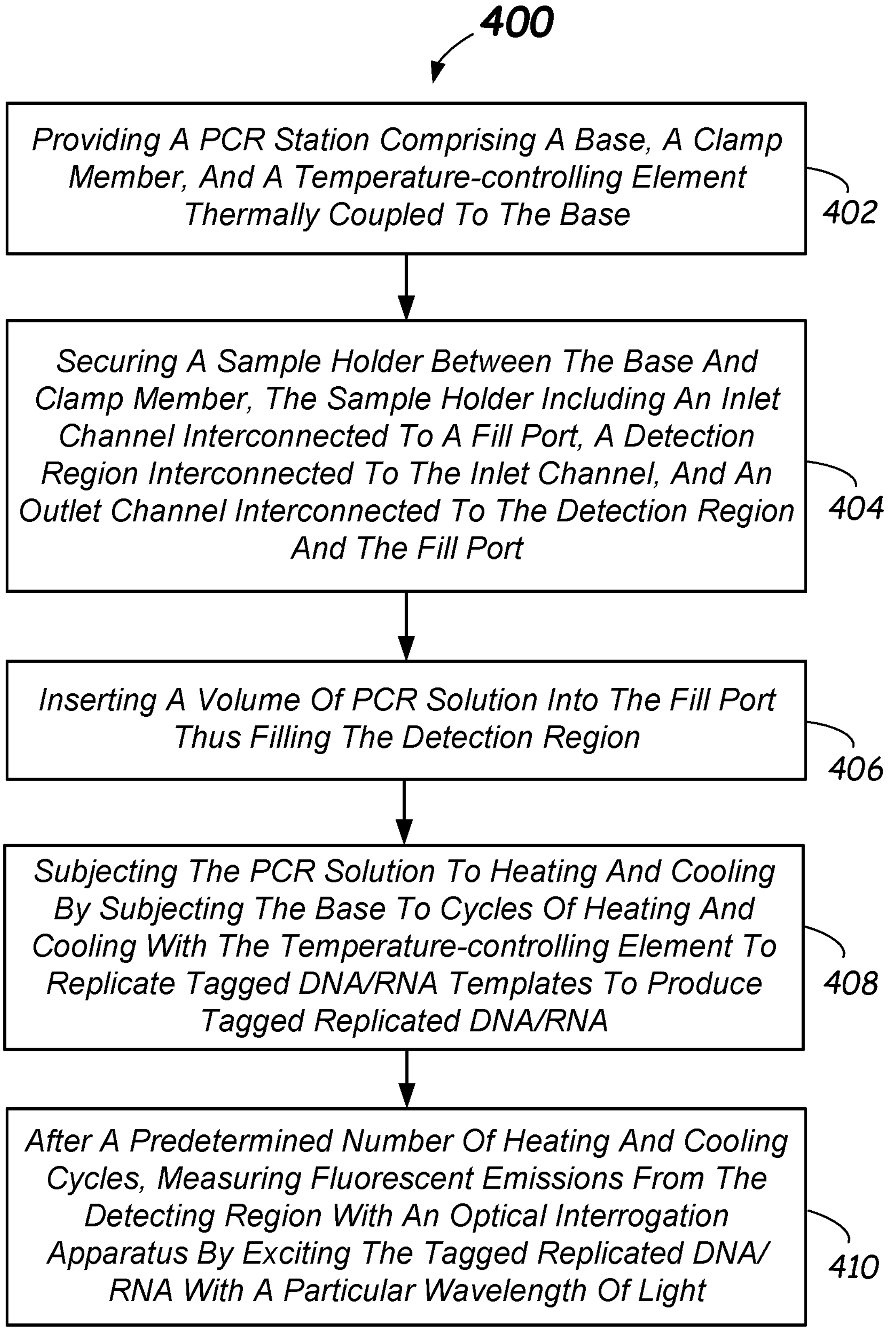
FIG. 4 is a flowchart illustrating a method of operating a PCR testing assembly according to one or more embodiments of the disclosure.

Referring now to FIG. 4, a broad method of operating a PCR testing system is provided according to one or more embodiments of the disclosure. The method 400 includes, in 402, providing a PCR station (e.g., PCR station 225) comprising a base (e.g., base 230), a clamp member (e.g., clamp member 232), and a temperature-controlling element (e.g., temperature-controlling element 234) thermally coupled to the base.

The method 400 includes, in 404, securing a sample holder (e.g., 100) between the base and clamp member, the sample holder including an inlet channel (e.g., inlet channel 118) interconnected to a fill port (e.g., fill port 114), a detection region (e.g., detection region 120) interconnected to the inlet channel, and an outlet channel (e.g., outlet channel 122) interconnected to the detection region and the fill port. Securing may be by way of a clamp initiator 235 or other suitable clamping or securement means.

The method 400 includes, in 406, inserting a volume of PCR solution (e.g., PCR solution 124) into the fill port thus filling the detection region. Insertion of the volume may be before or after the insertion of the sample holder 100 in the PCR station assembly 225. Thereafter, the channels 118, 122, ports 123, 126, and/or fill port 114 may be sealed as described herein.

Next, in 408, the PCR solution 124 is subjected to heating and cooling by subjecting the base 230 to cycles of heating and cooling with the temperature-controlling element 234 to replicate the tagged DNA/RNA templates and to produce tagged replicated DNA/RNA. The tagged replicated DNA/RNA are replicates of the tagged DNA/RNA templates extracted by the previously conducted PCR sample processing via known methods.

According to the method, in 410, after a predetermined number of heating and cooling cycles, fluorescent emissions are detected and measured from the detecting region with an optical interrogation apparatus (e.g., interrogation apparatus 340) by exciting the tagged replicated DNA/RNA with a particular wavelength of light. This can be used to monitor the progress of the PCR process. Other wavelengths of light may be used to excite other fluorescent dyes tagged to the tagged replicated DNA along with associated changes to the respective filter 345 (and possibly filter 348) and dichroic mirror 346 in the optical interrogation apparatus 340 for analysis at other wavelengths as are known to those of ordinary skill in the art.

Fast PCR processing can be achieved using the sample holder 100, PCR station assembly 225, and PCR testing system 300 described herein. Further, only a small volume of the PCR solution 124 are needed to carry out the replication and testing. Sealing of the sample holder 100 prior to replication can act as a means of reducing cross contamination.

While the disclosure is susceptible to various modifications and alternative forms, specific apparatus, assembly, system, and method embodiments have been shown by way of example in the drawings and are described in detail herein. It should be understood, however, that it is not intended to limit the invention to the particular apparatus, assemblies, systems, or methods disclosed but, to the contrary, the intention is to cover all modifications, equivalents, and alternatives falling within the scope of the claims.

What is claimed is:

1. A sample holder, comprising:

a body having a top surface and a bottom surface, the body further comprising:

an inlet groove formed into the bottom surface;

an outlet groove formed into the bottom surface alongside the inlet groove;

a detection recess formed into the bottom surface and connected to the inlet groove and the outlet groove;

a fill port interconnected to both the inlet groove and the outlet groove, the fill port having a top surface that extends above the top surface of the body and comprising an inlet port connected to the inlet groove and an outlet port connected to the outlet groove; and a cover connected to the bottom surface wherein the cover interfaces with the body to form an inlet channel interconnected to and positioned between the inlet port of the fill port and a detection region, and an outlet channel interconnected to and positioned between the detection region and the outlet port of the fill port.

2. The sample holder of claim 1, wherein the inlet channel comprises an inlet first channel portion and an inlet second channel portion that is wider than the inlet first channel portion.

3. The sample holder of claim 1, wherein the outlet channel comprises an outlet first channel portion and an outlet second channel portion that is wider than the outlet first channel portion.

4. The sample holder of claim 1, wherein a volume of a PCR solution contained in the sample holder when undergoing detection is from 3 μl to 20 μL.

5. The sample holder of claim 1, wherein the cover connected to the bottom surface comprises a film of a plastic or metal material.

6. The sample holder of claim 1, wherein the body is formed of a transparent or translucent material.

7. The sample holder of claim 1, comprising providing at least one sealing member to seal a PCR solution in a reservoir.

8. The sample holder of claim 7, wherein the at least one sealing member comprises a heat-sealed area or a deformed area along the length of one or more of the inlet channel and the outlet channel.

9. The sample holder of claim 7, wherein the at least one sealing member can be comprises a sealing film sealed to a top of the fill port.

10. The sample holder of claim 7, wherein the at least one sealing member comprises two sealed areas along at least one of the first channel or the second channel, or both.

11. A PCR station assembly, comprising:

a base configured to receive the sample holder of claim 1;

a clamp member configured to secure the sample holder to the base; and a temperature-controlling element operable to heat and cool the base in intimate thermal contact with the sample holder.

12. The PCR station assembly of claim 11, comprising a thermal sensor thermally coupled to the base.

13. The PCR station assembly of claim 11, wherein the temperature-controlling element is configured to produce temperature cycles of between about 55° C. to about 95° C.

14. The sample holder of claim 1, wherein the inlet and outlet channels run substantially parallel to one another.

15. A method of operating a PCR testing system, comprising:

providing a PCR station comprising a base, a clamp member, and a temperature controlling element thermally coupled to the base;

securing a sample holder between the base and clamp member, the sample holder including an inlet channel interconnected to an inlet port of a fill port, a detection region interconnected to the inlet channel, and an outlet channel interconnected to and positioned between the detection region and an outlet port of the fill port;

inserting a volume of PCR solution into the fill port thus filling the detection region;

subjecting the PCR solution to heating and cooling by subjecting the base to cycles of heating and cooling with the temperature-controlling element to replicate tagged DNA/RNA templates to produce tagged replicated DNA/RNA; and after a predetermined number of heating and cooling cycles, measuring fluorescent emissions from the detection region with an optical interrogation apparatus by exciting the tagged replicated DNA/RNA with a particular wavelength of light.

* * * * *